No. 785,278. PATENTED MAR. 21, 1905.
A. W. SMITH.
TYPE WRITING MACHINE
APPLICATION FILED SEPT. 4, 1903.
3 SHEETS—SHEET 3.
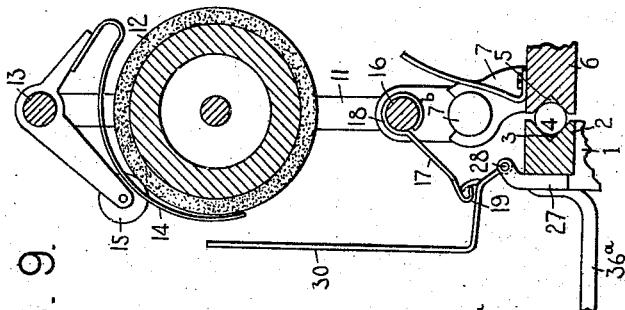
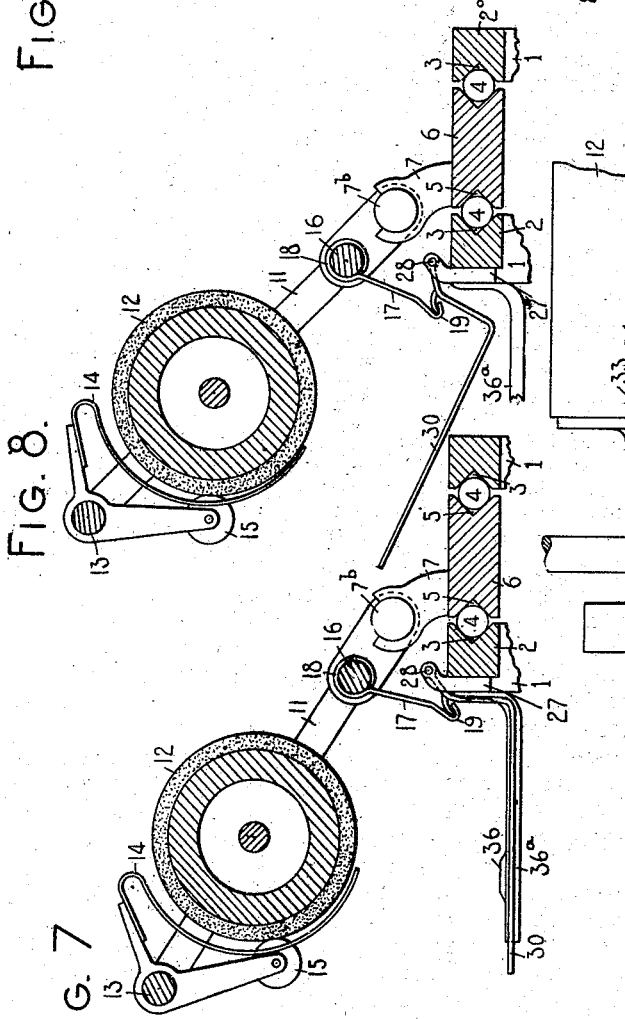
WITNESSES: 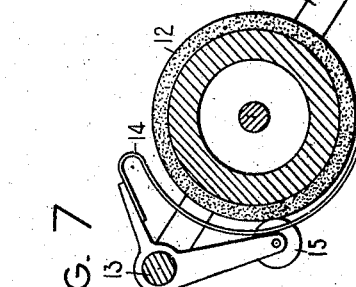
INVENTOR:
Arthur W. Smith
by Jacob Felbel
His Attorney No. 785,278.                                                    Patented March 21, 1905.

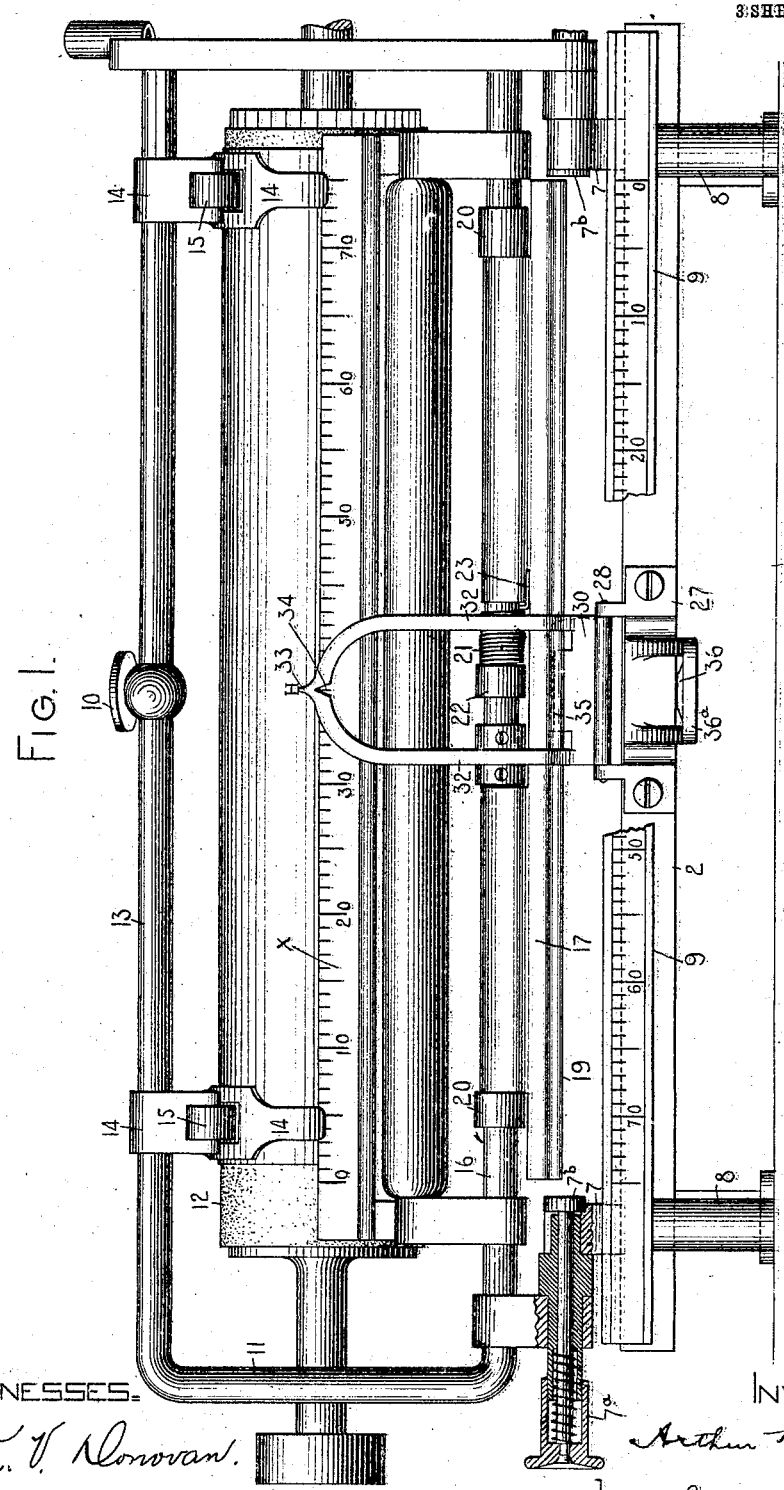

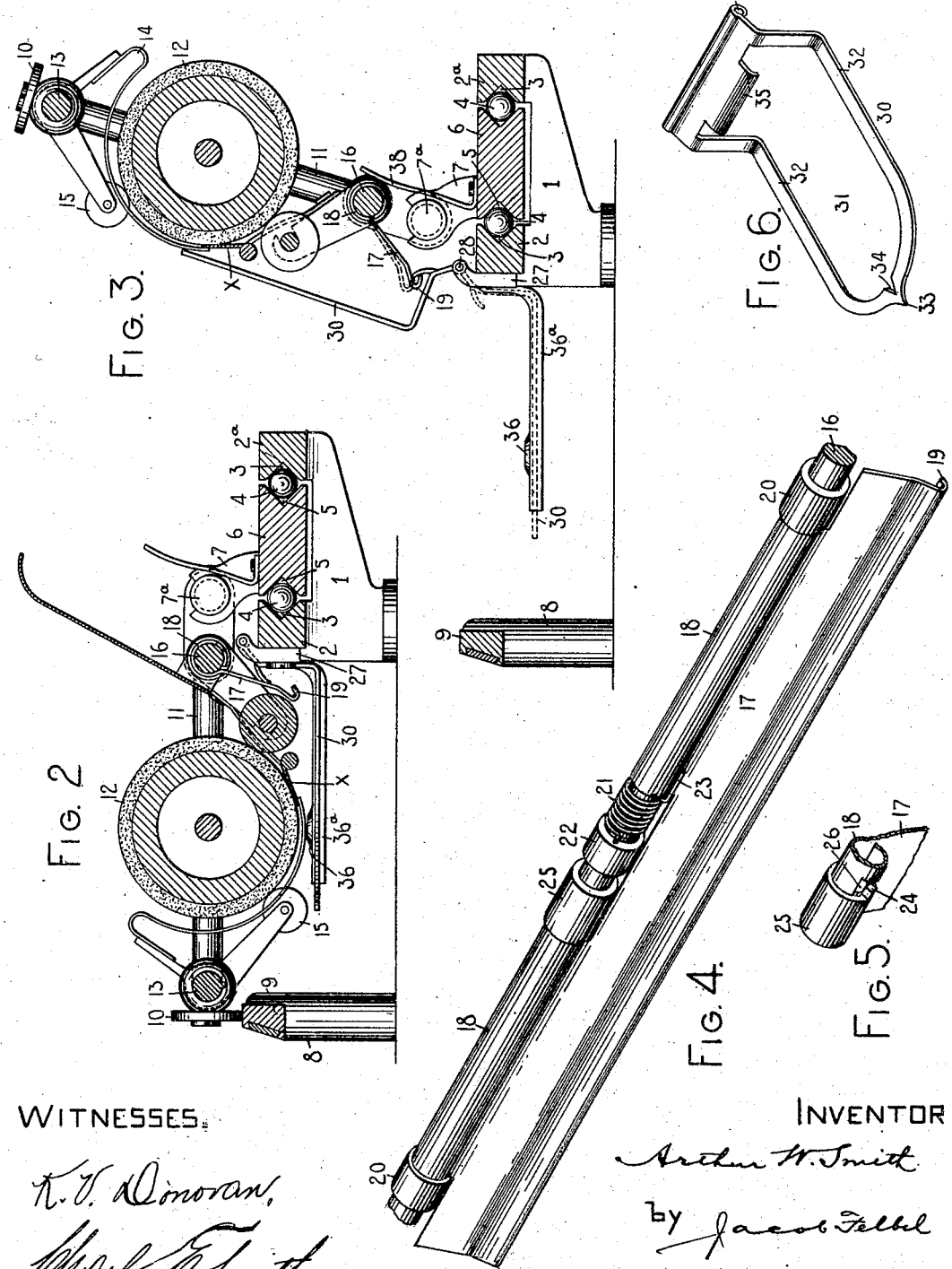

UNITED STATES PATENT OFFICE.

ARTHUR W. SMITH, OF NEW YORK, N. Y., ASSIGNOR TO YOST WRITING MACHINE COMPANY, OF ILION, NEW YORK, A CORPORATION OF NEW YORK.

TYPE-WRITING MACHINE.

SPECIFICATION forming part of Letters Patent No. 785,278, dated March 21, 1905.

Application filed September 4, 1903. Serial No. 171,884.

*To all whom it may concern:*

Be it known that I, ARTHUR W. SMITH, a citizen of the United States, and a resident of the borough of Manhattan, city of New York, in the county of New York and State of New York, have invented certain new and useful Improvements in Type-Writing Machines, of which the following is a specification.

My invention relates to type-writing machines, and more particularly to printing-point indicators therefor; and the invention is in the nature of an improvement upon the construction shown in the patent granted to G. W. N. Yost April 21, 1891, No. 450,806.

In certain kinds of printing-point indicators heretofore devised, and more particularly those which employ springs to automatically move the indicator to the indicating position when the platen is swung back to expose the writing, considerable difficulty has been encountered by reason of the pointer at times engaging the paper-feed rollers during the swinging of the platen to the normal position and at times interfering with the feed of the carriage by bearing thereon and by coming into contact with the paper-feeding devices during the travel of the carriage. Then, again, considerable difficulty has been experienced by the indicator contacting with the printed matter and blurring the imprint on the paper and by the sharp end of the pointer engaging the paper and mutilating it.

One object of my invention is to overcome these and other difficulties which have been encountered heretofore and to provide a simple and efficient printing-point indicator that may be readily applied to existing forms of type-writing machines.

Another object of my invention is to provide an indicator which may be readily connected to or disconnected from its moving means, so that the indicator may remain away from the printing point or line when desired to facilitate making erasures at the printing point or line and to facilitate removing the carriage.

To the above and other ends, which will hereinafter appear, my invention consists in the various features of construction, arrangements of parts, and combinations of devices to be hereinafter described, and particularly pointed out in the appended claims.

In the accompanying drawings, wherein like reference characters indicate corresponding parts in the various views, Figure 1 is a front elevation of sufficient number of parts of one form of type-writing machines to illustrate my invention in its application thereto, the figure illustrating the platen turned back and the indicator at the printing-point. Fig. 2 is a transverse sectional view of the same, the view illustrating the carriage in the normal or operative position. Fig. 3 is a transverse sectional view of the same, showing the carriage swung back and the indicator in the indicating position, as illustrated in Fig. 1. Fig. 4 is an enlarged fragmentary detail perspective view of the so-called "bar" or "actuator" and its carrier. Fig. 5 is a fragmentary detail perspective view of a portion of the same. Fig. 6 is a detail perspective view of the printing-point indicator. Figs. 7, 8, and 9 are diagrammatic transverse sectional views showing the different positions assumed by the parts during different stages of the swinging movement of the carriage. Fig. 10 is a detail fragmentary front elevation corresponding to Fig. 1, but showing the carriage beyond the normal limits of its travel.

I have shown my invention applied to a "No. 10 Yost" type-writing machine, though it should be understood that the invention may be applied to other types of writing-machines.

Secured to the top plate or type-ring are brackets 1, which support the rear fixed tracks 2 and $2^a$ for the carriage, which tracks have oppositely-disposed grooves 3 therein for the reception of antifriction-balls 4, that are likewise received in the oppositely-disposed grooves 5 in the carriage-bar 6. Extending upwardly from the carriage-bar are open-mouthed recessed bracket-arms 7, which coöperate with spring-pressed pivot-bolts $7^a$, provided with locking-heads $7^b$ and which connect the platen-frame to the carriage-bar and afford a swinging movement of the platen frame or carriage around the pivot-bolts as a center. Upwardly-extending supports 8, secured to the type-ring or top plate, have a track 9 secured thereto for supporting a traction-roller 10, carried by the front of the platen-frame 11. A platen 12 is mounted to revolve in the platen-frame, and the front cross-bar 13 of the platen-frame is provided with the usual coöperating paper feeding and guiding devices 14 for the margins of the paper, and these devices support margin feed-rollers 15. The rear cross-bar 16 of the platen-frame constitutes the pivot for and supports a so-called "bar" or "actuator" 17. This bar or actuator is in the nature of a flat strip of metal, which is bent at 18 so as to surround the cross-bar 16 and to turn thereon. The lower edge of this bar is turned up at 19 to form a hook-like flange or engaging member. The bar extends longitudinally of the platen and in length is substantially equal to the travel of the carriage and to the platen-scale $x$ and is prevented from longitudinal movement on the bar 16 by collars 20, which are secured thereto. A coiled spring 21 surrounds the cross-bar 16 and is secured at one end to a fixed collar 22 and bears at its opposite end 23 against the bar, pressing it rearwardly. The swinging movement of the bar on the rod 16 is limited by a finger or stop 24, which projects from a sleeve 25, secured to the rod 16, and said finger extends into a cut-out or opening 26 in the part 18 of the so-called "actuator" 17, and the walls of the cut-out coöperate with the stop 24, and thus control the independent movement of the bar or actuator 17 around the rod 16 and cause the actuator to swing with the carriage.

A bracket 27 is secured to the rear fixed track 2 and has a bearing therein for the reception of a pivot 28, which projects through the barrel-bearing 29 of a printing-point indicator 30. This indicator consists of a loop-like device, forming a central opening 31 therein between the parallel side arms 32, and the forward end of this device is pointed, as indicated at 33, and opposite the point or index 33 is an indicating-recess 34 for purposes which will hereinafter appear. Projecting forwardly and downwardly from the rear portion of the indicator is an engaging member or finger 35, which is adapted to coöperate with the hook-like member 19 on the bar 17. The construction of the indicator is such that the side arms 32 thereof extend on opposite sides of the fixed type-guide 36 and its supporting-bracket 36$^a$ when the indicator is in the normal position, whereas the point 33 and recessed portion 34 extend beyond the free end of said bracket.

From an examination of Fig. 2 it will be observed that in the normal positions of the parts the bar or actuator 17 bears lightly against the engaging member 35 and that there is nothing to interfere with the free travel of the carriage. When, however, the carriage or platen-frame is swung back around its pivotal center 7$^a$, the engaging member 19 on the bar will when the carriage assumes the position shown in Fig. 7 engage the coöperating member 35 on the indicator, and a further swinging movement of the carriage will cause the indicator to be positively moved with the carriage until it has assumed the indicating position shown in Fig. 3, the parts at this time being in the rearmost position and the platen-frame bearing against an arresting-stop 38, which prevents its further rearward movement. From an examination of Figs. 2, 7, 8, 9, and 3, which show the progressive swinging movements of the carriage from the normal or operative position back to the rearmost position, where the printing point is exposed, it will be seen that the printing-point indicator at no time reaches contact with the platen or the paper thereon, nor does it interfere with the travel of the carriage whether the latter be in the normal position or be turned back, as shown in Figs. 1 and 3, and the indicator cannot come into contact with the margin feed-rollers 15 or the paper-feeding devices 14 during the swinging movements of the platen to and from the normal position whatever be the position of the carriage along the line of travel.

Should the operator desire to make an erasure at the printing-point, it is unnecessary to move the carriage to either one side or the other of the printing-point indicator or to turn the platen in order to move the matter to be erased away from the printing-point indicator. It is merely necessary in order to effect an erasure at the printing-point to grasp the bar 17 and turn it against the tension of the spring 21 to the dotted-line position. (Shown in Fig. 3.) This movement of the bar 17 is effective to disengage it from the coöperating engaging member 35 on the indicator, when the indicator may drop by its own weight to the normal position. (Represented in dotted lines in Fig. 3.) In this manner the carriage or platen-frame may be readily disconnected at will from the printing-point indicator, and as soon as pressure is released from the bar 17 the spring 21 will restore it to its normal position with reference to the rod 16. When the carriage is turned down to the position shown at Fig. 2, the bar will again assume its normal position with reference to the coöperating engaging member 35, and when the platen is again turned up it will automatically move the printing-point indicator to the indicating position. It will thus be seen that means in the nature of a catch are provided for automatically connecting the printing-point indicator to its operating means after the indicator has been released therefrom, that one member of the catch is carried by the platen-frame and the other by the printing-point indicator, and that hand-actuated means are employed for disengaging said catch at will.

In the No. 10 Yost machine spring-pressed pivot-bolts 7ª, such as those shown herein and in the application of Chas. W. Walker, Serial No. 86,821, filed December 21, 1901, are employed for enabling the ready removal of one carriage or platen-frame and the substitution of another with a platen of different length, though for the purpose of the present invention any suitable means may be employed for this purpose. It will of course be understood that in the event of the substitution of a long interchangeable carriage for a short one the travel of the long platen-carriage exceeds that of the short one. In accordance with the present invention this substitution may be readily accomplished without interference by or with the printing-point indicator, notwithstanding it is connected to be positively moved by the swinging carriage, and without modifying or adjusting the indicating mechanism. Thus it is merely necessary to disengage the bar or actuator 17 from the indicator and substitute one carriage or platen-frame for another. As soon as the disengagement of the bar or actuator from the indicator is effected the indicator drops to its normal position and is out of the way of the carriage and does not interfere in any manner with the substitution of one carriage or platen-frame for another and does not extend to a position where it is liable to become deranged or broken when such substitution is effected. It will of course be understood that the relation of the actuator 17 to the indices on the platen-scale $x$ is the same whether a long or a short platen is employed. In other words, in all cases the length of the actuator is preferably coextensive with that of the carriage travel or the length of the platen-scale, the actuators being of different lengths for the different lengths of platen. One printing-point indicator will coöperate in the manner above described whether the platen-carriage be long or short.

From an examination of Fig. 1 it will be seen that the recess 34 in the printing-point indicator registers with the graduation on the platen-scale when the indicator is in the indicating position, so as to readily determine what point in the travel of the carriage has been reached or to determine the relation of the carriage to the printing-point. In other words, when the carriage has reached the thirty-seventh letter-space position and the platen-frame is turned back, as indicated in Fig. 1, the point 33 will register with the printing-point, and the indicating-aperture 34 will register with the thirty-seventh graduation on the platen-scale.

Upon reference to Fig. 10 it will be seen that when the carriage moves to the right or left beyond a point where the pointer coöperates with the graduations on the platen-scale the actuator 17 will be moved beyond the engaging member 35, thus automatically disconnecting the actuator from the indicator and enabling the latter to automatically drop to the normal position, (represented in dotted lines in Fig. 3,) so that there is no liability of the pointer being deranged or broken by a movement of the carriage beyond the normal travel thereof, as is sometimes the case in spring-pressed pointers.

From an examination of Figs. 3 and 9 it will be observed that the actuator 17 affords a direct pressure upon the indicator during the initial portion of the movement of the platen-frame from the position shown in Fig. 3 to the normal position indicated in Fig. 2, so as to positively move the indicator out of the indicating position and to positively prevent the indicator from engaging the margin feed-rollers 15 or the paper-feeding devices 14 during the return movement of the platen-frame to the normal position.

Various changes may be made without departing from the spirit of my invention, and from certain aspects of my invention it is immaterial whether a removable or a non-removable platen frame or carriage be employed.

What I claim as new, and desire to secure by Letters Patent, is—

1. In a type-writing machine, the combination of a swinging platen, an indicator, means for positively moving the indicator to the indicating position when the platen is turned back, said means being constructed to enable the indicator to remain in the normal or non-indicating position if desired when the platen is in the turned-back position.

2. In a type-writing machine, the combination of a swinging platen, an indicator that is connected to be positively moved to the indicating position when the platen is turned up, and means for at will releasing the indicator from its moving means.

3. In a type-writing machine, the combination of a swinging platen, an indicator that is connected to automatically move to the indicating position when the platen is turned back, and hand-operated means for disconnecting said indicator from its moving means so that the indicator may be in the normal or non-indicating position when the platen is turned back.

4. In a type-writing machine, the combination of a swinging platen-frame, a platen carried thereby, a pivoted indicator, connections between the indicator and the platen-frame, so that a swinging movement of the platen-frame will cause the indicator to move to the indicating position, and hand-actuated means for disconnecting the indicator from the platen-frame, so as to enable the indicator to drop by gravity from the indicating position when desired.

5. In a type-writing machine, the combination of a swinging platen-frame, a platen carried thereby, a pivoted indicator, connections between the indicator and the platen-frame, so that a swinging movement of the platen-frame will cause the indicator to move to the indicating position, hand-actuated means for disconnecting the indicator from the platen-frame, so as to enable the indicator to drop by gravity from the indicating position when desired, and means for automatically connecting the platen-frame to the indicator by a movement of the platen-frame down to the normal position.

6. In a type-writing machine, the combination of a swinging platen, a printing-point indicator, and releasable connecting devices between the platen and the indicator whereby the indicator may either be drawn up into operative position through said connections by the movement of the platen or may be disconnected from the platen and left in its normal non-working position when the platen is in upturned position.

7. In a type-writing machine, the combination of a swinging platen, a movable automatically-actuated indicator controlled by the swinging movement of the platen, means for rendering the indicator inoperative to automatically indicate, and means for automatically engaging the indicator to render it operative.

8. In a type-writing machine, the combination of a swinging platen, an indicator operatively connected to and adapted to be controlled by the swinging movement of the platen, a catch for operatively connecting said indicator, and hand-operated means for releasing said catch.

9. In a type-writing machine, the combination of a swinging platen, an indicator operatively connected to and adapted to be controlled by the swinging movement of the platen, a catch for operatively connecting said indicator, hand-operated means for releasing said catch, and means for automatically effecting an engagement of said catch after it has been released and the platen is turned down.

10. In a type-writing machine, the combination of a swinging platen-frame, a platen carried thereby, an actuator carried by said frame, an indicator, and a releasable catch between said indicator and actuator.

11. In a type-writing machine, the combination of a swinging platen-frame, a platen carried thereby, a bar carried by said platen-frame, a movable indicator that is operatively connected to and is adapted to be controlled by said bar, and means for disconnecting the indicator from the bar.

12. In a type-writing machine, the combination of a swinging platen-frame, a platen carried thereby, a bar carried by said platen-frame, an indicator pivoted to a fixed portion of the machine and with relation to which the said bar is adapted to move in the direction of the travel of the platen-frame, and a releasable catch between the bar and indicator.

13. In a type-writing machine, the combination of a swinging platen-frame, a platen carried thereby, an actuator that is pivoted to said platen-frame and is substantially coextensive with the travel of the carriage, an indicator pivoted to a fixed portion of the machine, and means for effecting a connection between the said pivoted actuator and the indicator and for affording a lost motion between said parts.

14. In a type-writing machine, the combination of a swinging platen-frame, a platen carried thereby, a bar that is pivoted to said platen-frame and extends substantially throughout the travel of the carriage and has a hook-like flange on one edge thereof, and an indicator pivoted to a fixed portion of the machine and having an engaging member that is adapted to engage the hook-like flange on the bar.

15. In a type-writing machine, the combination of a swinging carriage, a movable indicator, and a pivoted actuator and coöperating catch member interposed between said carriage and indicator, whereby the indicator may be connected to or disconnected from the carriage at will.

16. In a type-writing machine, the combination of a swinging carriage, and an indicator operatively connected to be moved to the indicating position by a swinging movement of the carriage and automatically released from the carriage by a travel thereof beyond the normal limits.

17. In a type-writing machine, the combination of a swinging carriage, an indicator pivoted to a fixed portion of the machine and operatively connected to be moved to the indicating position by a swinging movement of the carriage, and a catch that forms the operative connection between the carriage and indicator and which is automatically released when the carriage travels beyond its normal limits.

18. In a type-writing machine, the combination of a swinging carriage, a bar pivoted to said carriage and having an engaging member, and a pivoted indicator having an engaging member that coöperates with the engaging member on the bar and adapted to be released therefrom and to afford a movement of the bar with relation thereto during the travel of the carriage.

19. In a type-writing machine, the combination of a swinging carriage, a platen, a pivoted printing-point indicator that is operatively connected to the carriage to be positively moved to the indicating position by the swinging movement of the carriage and is at all times out of contact with the platen or the paper thereon, and means for detaching the indicator from the carriage.

20. In a type-writing machine, the combinawith a swinging carriage, a platen, and margin feed-rollers, of a printing-point indicator which is operatively connected to the carriage to be positively moved to the indicating position by the swinging movement of the carriage and is at all times maintained out of contact with the platen or the paper thereon and with the paper-feed rollers, and means for detaching the indicator from the carriage.

21. In a type-writing machine, the combination of a swinging platen, and a pivoted printing-point indicator that is free from contact with the platen or the paper thereon during the swinging movements of the platen and is operatively connected to the carriage so as to be positively moved in both directions by the swinging movement of the platen, and means for disconnecting the indicator from its moving means.

22. In a type-writing machine, the combination of a swinging platen-frame, a platen carried thereby, a printing-point indicator pivoted to a fixed portion of the machine and positively moved in both directions by the swinging movements of the platen-frame, a bar, and means for engaging said bar, one of said bar and engaging means elements being carried by and swinging with the platen-frame and the other being connected to the printing-point indicator.

23. In a type-writing machine, the combination of a swinging platen-frame, a platen carried thereby, a printing-point indicator pivoted to a fixed portion of the machine and positively moved in both directions by the swinging movements of the platen-frame, an actuator connected to the platen-frame, and means for disengageably connecting the printing-point indicator and said actuator.

24. In a type-writing machine, the combination of a swinging platen-frame, a platen carried thereby, a printing-point indicator pivoted to a fixed portion of the machine, the swinging movement of which is controlled by a swinging bar that is controlled by the swinging movement of the platen-frame, and means for disconnecting said indicator from said bar.

25. The combination with a type-writing machine having interchangeable carriages, of an indicator pivoted to a fixed portion of the machine, engaging means carried by the carriages and coöperating with the indicator for automatically moving the indicator to an indicating position by a swinging movement of the carriage on the machine, and means for readily effecting a disengagement between the engaging means on the carriages and the indicator.

Signed in the borough of Manhattan, city of New York, in the county of New York and State of New York, this 1st day of September, A. D. 1903.

ARTHUR W. SMITH.

Witnesses:
K. V. DONOVAN,
E. M. WELLS.